Figure 1:
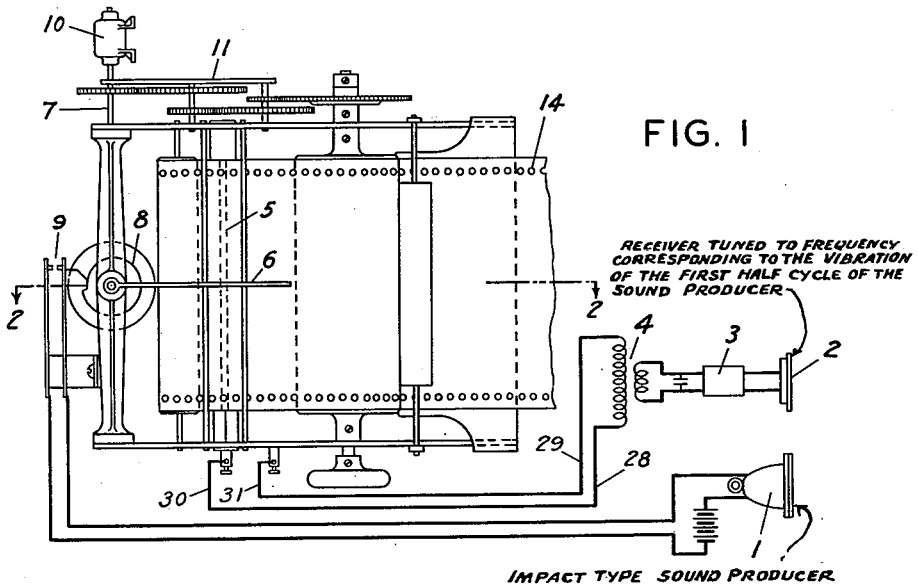

July 30, 1935.  E. E. TURNER, JR  2,009,460

MEANS FOR MEASURING DEPTHS OR DISTANCES

Original Filed Oct. 31, 1930

INVENTOR
EDWIN E. TURNER JR.
BY
ATTORNEY

Patented July 30, 1935

2,009,460

UNITED STATES PATENT OFFICE 2,009,460

MEANS FOR MEASURING DEPTHS OR DISTANCES

Edwin E. Turner, Jr., West Roxbury, Mass., assignor to Submarine Signal Company, Boston, Mass., a corporation of Maine Original application October 31, 1930, Serial No. 492,518. Divided and this application October 28, 1932, Serial No. 640,078

1 Claim. (Cl. 177—386)

The present invention relates to a means for measuring depths or distances particularly distances to a reflecting object or surface as the bottom of the ocean or the surface of the earth from a vessel or aircraft respectively.

This application is a division of my copending application Serial No. 492,518, filed October 31, 1930.

The invention is in particular applied to making a continuous and permanent record in depth soundings in water and will be more particularly described in this connection.

In the system of the present invention a compressional wave signal is emitted and the echo reflected from the ocean bottom is received on a receiver, the time interval between the emission of the signal and the recept of the echo being measured in terms of ocean depth.

The general method outlined above of taking depth soundings has been commonly employed in the art and forms the basis of most acoustic depth sounders. These acoustic depth sounders provide for the most part a momentary indication and do not give a permanent record which in some cases is valuable. There are, however, acoustic depth sounders which provide permanent records as, for instance, the device disclosed in the United States Patent No. 1,667,540 in which the record may be made permanent by pricking a hole with an electric current in a paper.

The present invention relates to the same type of apparatus, as briefly described above, but has many advantages in the arrangement and combination of its component parts in producing a more efficient and more easily operated sounding device capable of providing a permanent record.

While the power of the emitted signal has been increased in recent developments of acoustic depth sounding apparatus by concentrating all the sound energy into a single blow, it is still true that very little energy is received and that for depths greater than 400 fathoms it is very often difficult to detect an echo except upon a telephone receiver.

Consequently for the greater depths it is extremely difficult to operate a visual indicator or create a permanent record.

This is due for the most part to the fact that at these deep depths the water noise is as great as the signal and that except for the ear no detector has enough sense of selectivity to pick out the signal from the water noise. In fact, even when the signal strength exceeds that of the water noise, it frequently happens that there is such little difference in intensity that amplification of the signal is impossible. In these cases while there is signal energy available for producing a visual or written record, it is usually very small in magnitude and, therefore, the recording means must be very sensitive to operate properly.

In prior systems, therefore, where permanent records were made, as, for instance, by sparking through a paper, there was considerable difficulty experienced in producing sufficient energy at the electrodes to make a legible mark.

In the present invention many of these difficulties have been overcome and it is now possible to produce a permanent record at even greater depths than the ordinary visual means was capable of producing.

In the present system the sound producer is of the impact type in which the greater part of the sound energy is crowded into the first half cycle. The receiver is broadly tuned to the period matching the first half cycle. The entire sound energy so produced by the sound receiver is passed through an amplifier and the stray signals appearing above a certain noise level are consequently amplified as well as the signals representing the echoes from the bottom.

In this manner a certain amount of stray signals come through, yet since the echo also appears, and appears as a continuous function tracing a continuous curve, whereas the strays appearing all over the recording surface simply darken the surface in places but produce no noticeable record, a clear contour of the depth is produced.

By amplification, therefore, after somewhat selective tuning it is possible to produce a record in which the stray signals make no noticeable effect while the soundings produce a curve showing a complete record of the depth.

Figure 2:
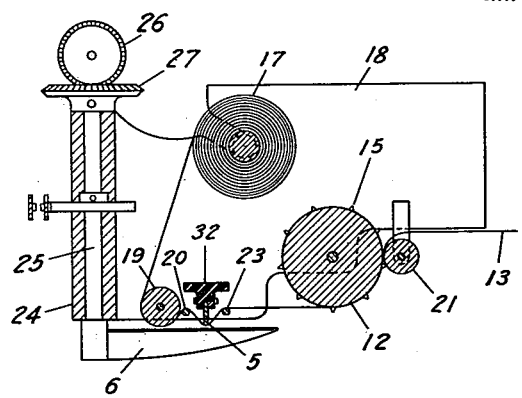

The present invention will be described in connection with the drawing in which Figure 1 shows a plan view of the invention with the sending and transmitting apparatus shown partly diagrammatically. Figure 2 shows a section on the line 2—2 of Figure 1.

In Figure 1 the compressional wave signal is emitted preferably by the impact oscillator 1 which may be of the same type of apparatus as that described in my copending application Serial No. 270,660, filed April 17, 1928.

The sound receiver is preferably a hydrophone of a type commonly used in submarine signaling. This is shown at 2 in the drawing and is preferably tuned, but not sharply tuned, to the frequency corresponding to the first half cycle of the vibration of the impact oscillator 1. The signal received at 2 is passed to an amplifier 3 which may also be, and preferably is, constructed after the fashion of the circuit used in my above mentioned application. The signal passing through the circuit 3 is made to cause a sudden discharge of current across the secondary of the transformer 4 and thereby bring about an electrical discharge across the electrodes 5 and 6, as shown more particularly in Figure 2. The discharge across the electrodes 5 and 6 may be purely of the arc type in which the dielectric between the electrodes is broken down when the current is caused to flow or it may be of the type in which a mere discharge of current is produced across a conducting surface.

In the present invention the signal emitted by the sound producer 1 is controlled and operated by the switch 9 through the action of the cam 8 which is rotated continuously and uniformly by means of the shaft 7 driven by the motor 10. The motor 10 at the same time drives a gear train 11 which, in turn, rotates the roller 12 carrying the recording surface or paper 13. The recording paper 12 may be punched with a series of uniform holes 14 and the roller may have projecting points 15 which engage in the holes 14 and move the paper in uniform manner. The recording paper 13 is wound about a spool 17 mounted in the lower part of the frame 18 of the apparatus. From the spool 17 the paper is conducted upward across the roll 19 and about the guide 20 over the knife electrode 5 which, as shown in Figure 1, extends across the entire device just beneath the recording sheet.

On the other side of the knife edge electrode 5 the paper passes beneath the guide 23 and then over the roller 12 and between the roller 21, as shown more particularly in Figure 2. The mechanism rotating the roll 15 serves also to rotate uniformly the moving electrode 6 which is positioned as shown in Figure 2 just above the edge of the lower electrode 5. The electrode 6 is also in the form of a knife edge and is mounted in a roller 24 which carries the shaft 25 on which the cam 8, described above, is also mounted. The motor 10 drives through the gear 26 and the beveled gear 27, the shaft 25 and rotates at a uniform speed the knife electrode 6.

In the operation of the device the signal is emitted from the striker 1 when the knife blade 6 passes over the zero mark on the recording paper 13. The knife edge 6 continues to rotate at a uniform speed while the sound travels to the bottom of the ocean and is reflected back and received by the receiver 2. The returning signal then is passed through the special amplifier circuit 3 and is impressed across the transformer 4 which is connected by the leads 28 and 29 to the terminals 30 and 31, respectively, in the recording device. The electrode 5 connecting to the terminal 30 is insulated by the bakelite or rubber insulating piece 32, the electrode 6, on the other hand, being connected or grounded to the apparatus itself.

The recording surface 13 is preferably a thin paper of the kind commonly used for a recording ammeter needle. The paper 13 may be graduated across its face so that the depth readings may be read off directly. The paper 13 is moved very slowly at a uniform speed, in fact, so slowly that the recording of individual depths appear as a continuous line upon its surface.

The signals of the sound producer 1 are operated approximately one every second. While most of these signals are picked up by the receiver 2 and caused to operate and produce a record on the paper 13, it frequently happens that the receiver 2 will pick up other stray signals which likewise may produce a discharge across the electrodes 5 and 6. This is particularly true, as has been pointed out above, with the use of an amplifier in the recording system on account of which both the signals and the strays, as they may be called, are recorded. In the present case, however, since the recording surface moves very slowly, perhaps of the order of a foot in an hour, the signals may be noted and distinguished from the strays, since the signals produce a continuous record of the depth; while in the case of the strays, however, these are scattered all over the paper and produce as a result only a slight discoloration or darkening of the paper.

The tuning of the diaphragm of the receiver for a particular frequency as is known is dependent upon the size of the diaphragm, the shape including its thickness, the elasticity and the medium in which it is to be used, and the invention in the present application does not reside in merely adjusting the resonance point of the sound receiver itself. The present invention resides in the particular combination of a sound producer of the impact type where only one large vibration is present with a sound receiver in a depth sounding system tuned to the first half cycle of the sound producer. In sound producers of the impact type, as the name implies, the sound is produced by the impact of an element against the diaphragm or sound-radiating member. During a greater part of the first half cycle the impact element is in contact with the diaphragm and therefore the mass of the diaphragm is augmented by the mass of the striking element. In addition to this the striking element provides the initial motion and up to a certain point the diaphragm moves in a different manner under the force of the impact than when it is freely vibrated. It is also true that when the impact element leaves the diaphragm, the mass of the impact element is the direct added mass to the mass of the diaphragm. In general, therefore, the first half vibration of an impact sounder is different from that of the subsequent free and smaller vibrations which follow. In the present invention the sound receiver is tuned to this broader first half cycle and not to the succeeding smaller vibrations that are set up after the impact element leaves the diaphragm.

Having now described my invention, I claim:

An apparatus for measuring depths or distances, comprising a sound producer of the impact type, a sound receiver tuned to the frequency corresponding to the vibration of the first half cycle of the sound producer and means for measuring the time interval between the production of the impact signal and the receipt of the echo.

EDWIN E. TURNER, Jr.